(12) United States Patent
Takabayashi et al.

(10) Patent No.: US 6,469,305 B2
(45) Date of Patent: Oct. 22, 2002

(54) RADIATION IMAGE SENSOR

(75) Inventors: Toshio Takabayashi; Takuya Homme; Hiroto Sato, all of Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/739,425

(22) Filed: Dec. 18, 2000

(65) Prior Publication Data

US 2001/0023924 A1 Sep. 27, 2001

Related U.S. Application Data

(63) Continuation-in-part of application No. PCT/JP99/03263, filed on Jun. 18, 1999.

(30) Foreign Application Priority Data

Jun. 19, 1998 (JP) .............................. 10-173080

(51) Int. Cl.$^7$ ................................ G01T 1/20
(52) U.S. Cl. ............................ 250/361 R; 250/458.1; 250/483.1; 250/370.11
(58) Field of Search .................. 250/361 R, 458.1, 250/483.1, 370.11

(56) References Cited

U.S. PATENT DOCUMENTS 5,187,369 A    2/1993   Kingsley et al. ........ 250/370.11
6,172,371 B1 * 1/2001   DeJule et al. ........... 250/361 R

FOREIGN PATENT DOCUMENTS

| EP | 0 903 590 A1 | 3/1999 |
| JP | 63-215987 | 9/1988 |
| JP | 1-240887 | 9/1989 |
| JP | 5-242841 | 9/1993 |
| JP | 7-21560 | 3/1995 |
| WO | WO 99/38031 | 7/1999 |

* cited by examiner

Primary Examiner—Constantine Hannaher
Assistant Examiner—Andrew Israel
(74) Attorney, Agent, or Firm—Morgan, Lewis & Bockius LLP

(57) ABSTRACT

A radiation image sensor has a scintillator panel and an imaging device, and the scintillator panel comprises a radiation-transparent substrate, a deliquescent scintillator formed on the substrate, and an elastic organic film covering the scintillator, the scintillator panel and imaging device being bonded to each other with a matching oil interposed therebetween, whereas side wall portions of the scintillator panel and imaging device are firmly attached to each other with a resin.

7 Claims, 4 Drawing Sheets

RADIATION IMAGE SENSOR

RELATED APPLICATIONS

This is a Continuation-In-Part application of International Patent Application serial No. PCT/JP99/03263 filed on Jun. 18, 1999 now pending.

BACKGROUND OF THE INVENTION

1. Field of the Invention

The present invention relates to a radiation image sensor used for medical X-ray photography and the like.

2. Related Background Art

While X-ray sensitive films have been used in medical and industrial X-ray photography, radiation imaging systems using radiation detecting devices have been coming into wider use from the viewpoint of convenience and their storability of photographed results. In such a radiation imaging system, pixel data caused by two-dimensional radiation are acquired by a radiation detecting device as an electric signal, which is then processed by a processing unit, so as to be displayed onto a monitor.

Conventionally known as a typical radiation detecting device is one disclosed in WO92/06476. In this radiation detecting device, a scintillator formed on a substrate and an imaging device are bonded together with an adhesive, such that the radiation incident from the substrate side is converted into visible light by the scintillator, so as to be detected.

SUMMARY OF THE INVENTION

Meanwhile, individual columnar crystals of the scintillator formed on the substrate have different heights, thus yielding unevenness, whereby the tip portion of scintillator might collide with the light-receiving surface of imaging device when being bonded to the imaging device, thereby being damaged. Also, when the imaging device and the scintillator are firmly attached to each other with an adhesive, a distortion may occur in the substrate due to temperature changes, thereby causing a damage to columnar crystals of the scintillator. In the case where a cooling type CCD is used for the imaging device in particular, the distortion becomes greater upon drastic temperature changes, whereby the scintillator is more likely to be damaged.

It is an object of the present invention to provide a radiation image sensor which can prevent the scintillator from being damaged.

The present invention provides a radiation image sensor comprising a scintillator panel and an imaging device; wherein the scintillator panel comprises a radiation-transparent substrate, a scintillator formed on the substrate, and an elastic organic film covering the top and sides of the scintillator, and firmly attached to each other with a resin which surrounds the sides of the scintillator panel.

According to the present invention, since the scintillator is covered with an elastic organic film, the impact acting on the scintillator can be alleviated by way of the elastic organic film when bonding the scintillator panel to the imaging device, whereby the scintillator can be prevented from being damaged. Also, even when a distortion is generated in the substrate due to temperature changes, since the scintillator is covered with the elastic organic film, the stress acting on the scintillator according to the distortion of substrate can be alleviated by the elastic organic film, whereby the scintillator can be prevented from being damaged.

The resin may be attached to the side wall portions of the imaging device. It is preferable to fix the scintillator panel and the imaging device securely.

A radiation image sensor may further comprise an optical coupling material interposed between the scintillator panel and the imaging surface of the imaging device for improving imaging properties.

Also, the present invention is characterized in that the scintillator of radiation image sensor has a columnar structure. According to the present invention, since the tip portion of the scintillator having a columnar structure is covered with the elastic organic film, the impact acting on the tip portion of the scintillator having a columnar structure when superposing the scintillator panel onto the imaging device and the stress acting on the scintillator according to the distortion caused by temperature changes can be alleviated, whereby the tip portion of the scintillator having a columnar structure can be prevented from being damaged.

Preferably, the elastic organic film may cover the opposite side of the substrate on which the scintillator formed for securely protecting the scintillator from the moisture.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
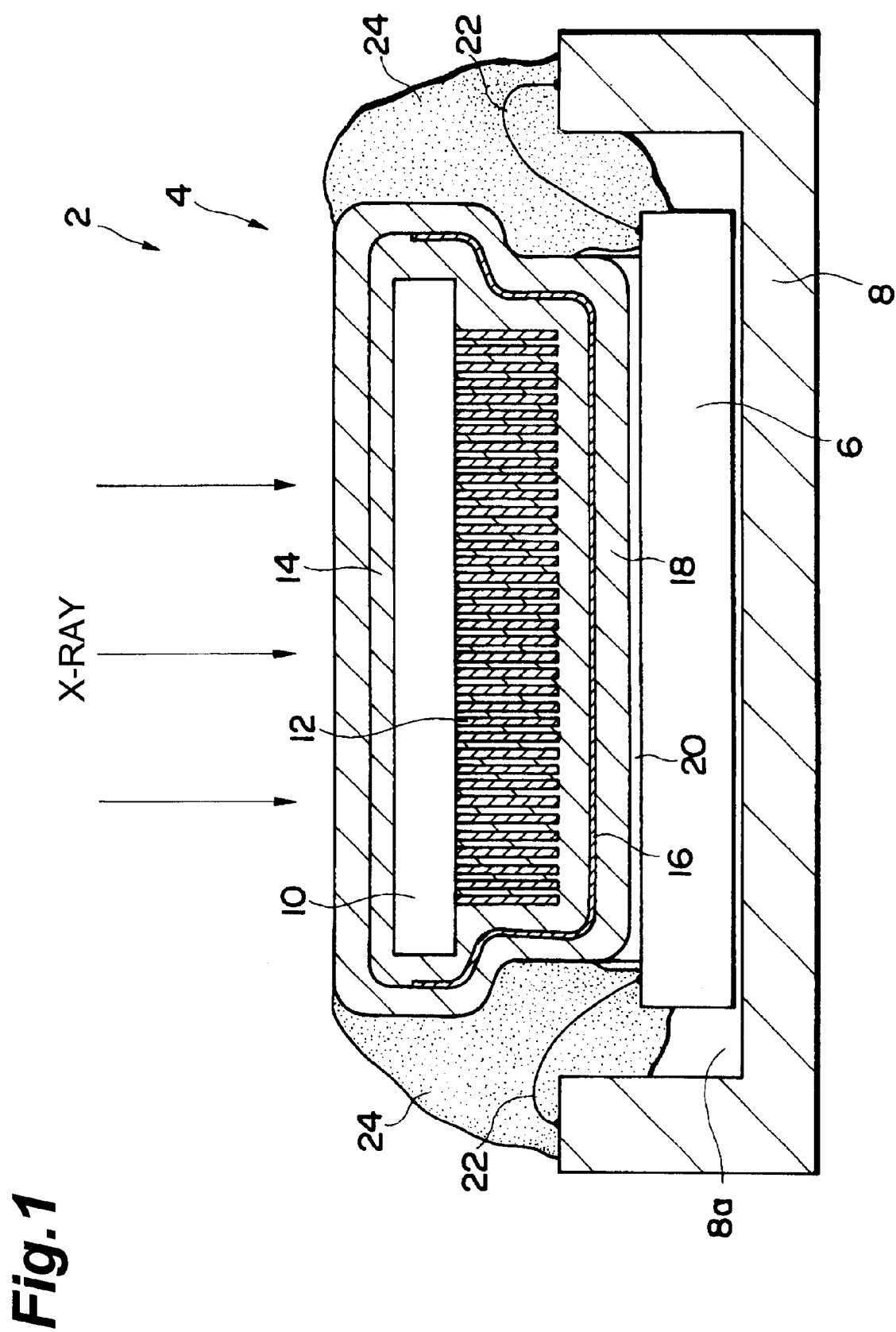
FIG. 1 is a sectional view of the radiation image sensor in accordance with an embodiment of the present invention.
Figure 2A:
FIGS. 2A, 2B, 2C, 3A and 3B are sequential views showing steps of making a scintillator panel in accordance with an embodiment of the present invention.
Figure 2B:
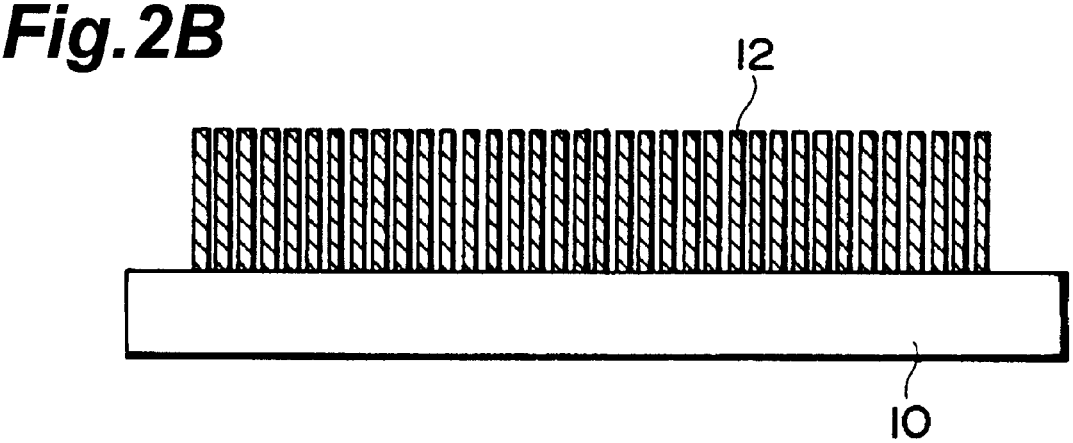
Figure 2C:
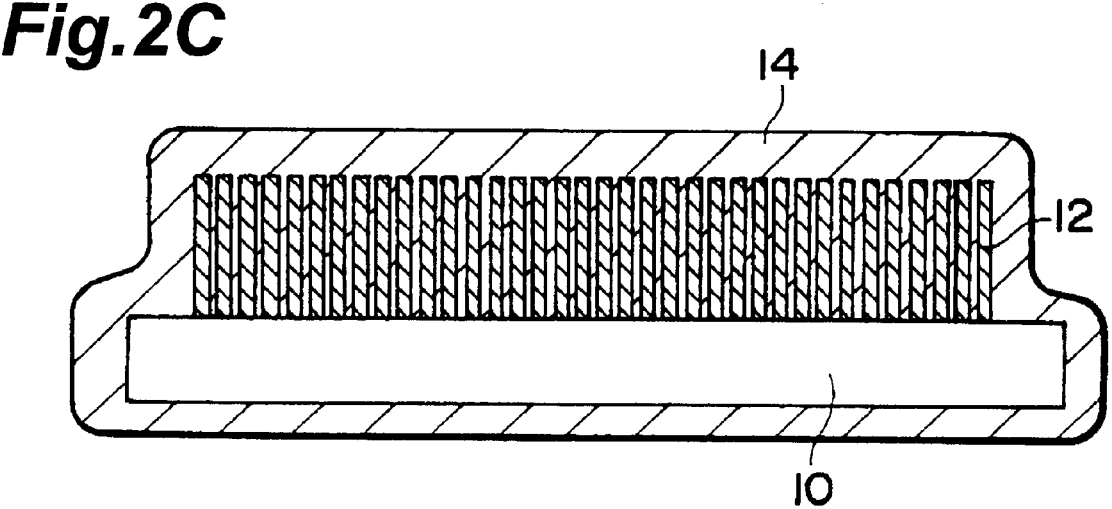

In the following, with reference to FIGS. 1 to 3B, embodiments of the present invention will be explained. FIG. 1 is a sectional view of a radiation image sensor 2 in accordance with an embodiment of the present invention. As shown in FIG. 1, the radiation image sensor 2 has a configuration in which a scintillator panel 4 and an imaging device 6 are bonded to each other and are accommodated in a ceramic case 8.

Here, one surface of a substrate 10 made of Al in the scintillator panel 4 is formed with a scintillator 12, having a columnar structure, for converting incident radiation into visible light. As the scintillator 12 CsI doped with Tl is used. All surfaces of the scintillator 12 formed on the substrate 10, together with the substrate 10, are covered with a first polyparaxylylene film (first organic film) 14 having an elasticity, whereas the surface of first polyparaxylylene film 14 on the scintillator 12 side is formed with an $SiO_2$ film (transparent inorganic film) 16. Further, the surface of SiO$_2$ film 16 and the surface of the part of first polyparaxylylene film 14 not formed with the SiO$_2$ film 16 on the substrate 10 side are formed with a second polyparaxylylene film (second organic film) 18, whereby all surfaces are covered with the second polyparaxylylene film 18.

On the other hand, the imaging device 6 is attached to the scintillator panel 4 on the scintillator 12 side with a silicone resin layer 20, as a matching oil, interposed therebetween, whereas the bottom part of imaging device 6 is accommodated in a cavity portion 8a of the ceramic case 8. As the matching oil, an optical coupling material such as a silicone potting gel exemplified by Sylgards available from Dow Corning Corporation is used. Further, side wall portions of the scintillator panel 4 and imaging device 6 are fixed to each other by a resin 24 for protecting a bonding wire 22 and fixing the scintillator plate 4 to the ceramic case 8.

With reference to FIGS. 2A to 3B, steps of making the scintillator panel 4 will now be explained. On one surface of a rectangular substrate 10 (having a thickness of 0.5 mm) made of Al, such as the one shown in FIG. 2A, columnar crystals of Tl-doped CsI are grown by vapor deposition method, whereby the scintillator 12 is formed by a thickness of 200 μm (see FIG. 2B).

Since CsI forming the scintillator 12 is high in moisture absorbency so that it will deliquesce by absorbing vapor in the air if left exposed, the first polyparaxylylene film 14 is formed by CVD method in order to prevent this from occurring. Namely, the substrate 10 formed with the scintillator 12 is put into a CVD apparatus, so as to form the first polyparaxylylene film 14 by a thickness of 10 μm. As a consequence, the first polyparaxylylene film 14 is formed on all surfaces of the scintillator 12 and substrate 10 (see FIG. 2C). Since the tip portion of scintillator 12 is uneven, the first polyparaxylylene film 14 also functions to flatten the tip portion of scintillator 12.

Figure 3A:
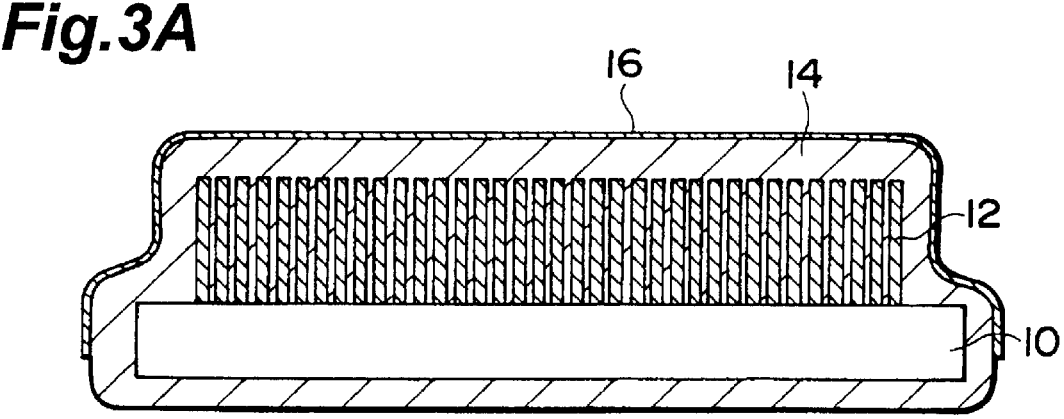

Subsequently, the SiO$_2$ film 16 is formed on the surface of first polyparaxylylene film 14 on the scintillator 12 side with a thickness of 200 nm by sputtering (see FIG. 3A). The SiO$_2$ film 16 is formed in an area covering the scintillator 12, since it is aimed at improving the moisture resistance of scintillator 12. Since the tip portion of scintillator 12 is flattened by the first polyparaxylylene film 14 as mentioned above, the SiO$_2$ film can be formed thinner (with a thickness of 100 nm to 300 nm) so that the output light quantity would not decrease.

Figure 3B:
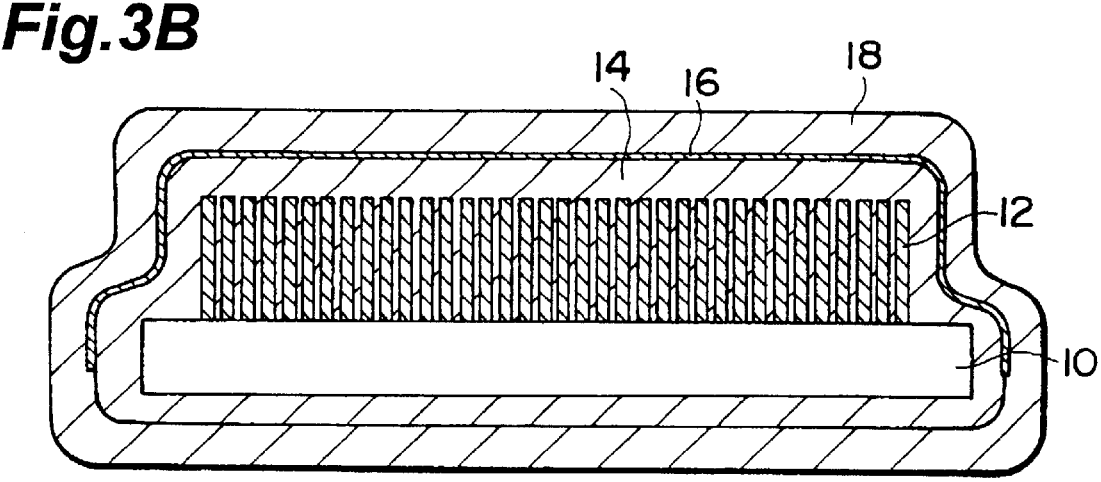

Further, the second polyparaxylylene film 18 for preventing the SiO$_2$ film 16 from peeling is formed with a thickness of 10 μm by CVD method on the surface of SiO$_2$ film 16 and the surface of first polyparaxylylene film 14 not formed with the SiO$_2$ film 16 on the substrate 10 side (see FIG. 3B). When this step is completed, the making of scintillator panel 4 ends.

Thereafter, the imaging device 6 is attached to the scintillator panel 4 on the scintillator 12 side with the silicone resin layer 20 interposed therebetween. Also, the bottom part of the imaging device 6 attached to the scintillator panel 4 is accommodated in the cavity portion 8a of ceramic case 8, whereas a pad portion of the imaging device 6 and a lead pin secured to the ceramic case 8 are electrically connected to each other with a bonding wire 22. Then, for protecting the bonding wire 22 and securing the scintillator plate 4 to the ceramic case 8, side wall portions of the scintillator panel 4 and imaging device 6 are fixed with the resin 24. When this step is completed, the making of the radiation image sensor 2 shown in FIG. 1 ends.

In the radiation image sensor 2 in accordance with this embodiment, since the scintillator 12 is covered with the first polyparaxylylene film 14 and is attached to the imaging device 6 with the silicone resin 20 interposed therebetween, the impact acting on the tip portion of scintillator 12 when bonding the scintillator panel 4 to the imaging device 6 can be alleviated by the first polyparaxylylene film 14, whereby the tip portion of scintillator 12 can be prevented from being damaged. Also, even when a distortion is generated in the substrate 10 due to temperature changes, since the scintillator 12 is covered with the first polyparaxylylene film 14, the stress acting on the scintillator 12 according to the distortion of substrate 10 can be alleviated by the first polyparaxylylene film 14, whereby the scintillator 12 can be prevented from being damaged.

Also, since the side walls of scintillator panel 4 and imaging device 6 are fixed with the resin 24, the connection between scintillator panel 4 and imaging device 6 can be made firm.

Though the silicone resin 20 is used as the matching oil (optical coupling material) in the above-mentioned embodiment, it is not restrictive; and epoxy resin, silicone oil, and the like may also be used.

Though the side wall portions of scintillator panel 4 and imaging device 6 are fixed with one piece of resin 24 in order to protect the bonding wire 22 and secure the scintillator plate 4 to the ceramic case 8, separate resins may be used for protecting the bonding wire 22 and for securing the scintillator plate 4 to the ceramic case 8.

Figure 4:
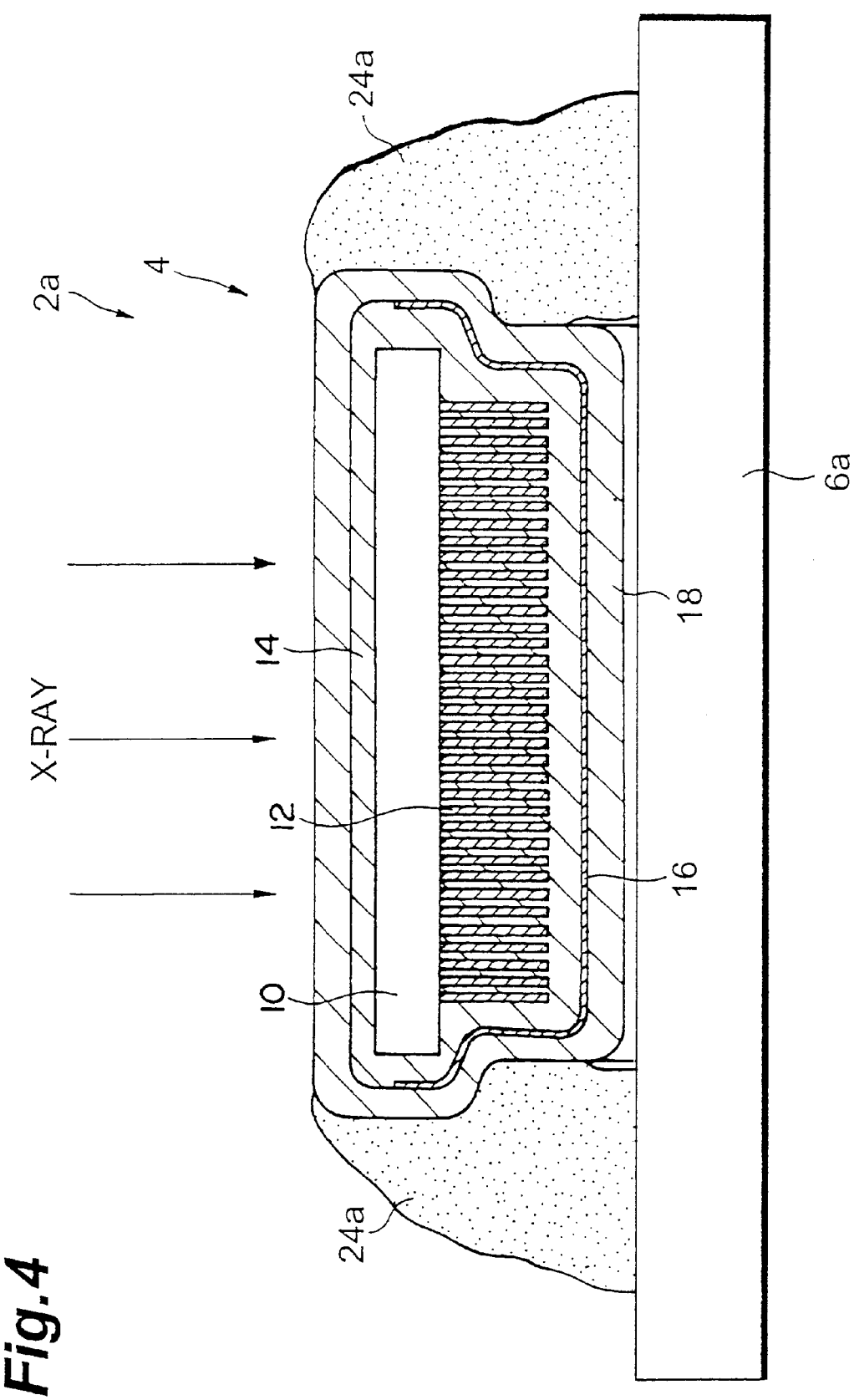
FIG. 4 is a sectional view of the radiation image sensor in accordance with an another embodiment of the present invention.

FIG. 4 is a sectional view of the radiation image sensor in accordance with an another embodiment of the present invention. This image sensor 2a differs from the image sensor 2 shown in FIG. 1 in two ways. First, the image sensor 2a does not have ceramic case 8 and the scintillator panel 4 is disposed on the imaging device 6a. Second, there is no matching oil layer 20 between the scintillator panel 4 and the imaging device 6a.

According to this structure, since the scintillator 12 is covered with the first polyparaxylylene film 14 and is attached to the imaging device 6a, the impact acting on the tip portion of scintillator 12 when bonding the scintillator panel 4 to the imaging device 6a can be alleviated by the first polyparaxylylene film 14, whereby the tip portion of scintillator 12 can be prevented from being damaged. Also, even when a distortion is generated in the substrate 10 due to temperature changes, since the scintillator 12 is covered with the first polyparaxylylene film 14, the stress acting on the scintillator 12 according to the distortion of substrate 10 can be alleviated by the first polyparaxylylene film 14, whereby the scintillator 12 can be prevented from being damaged.

Also, since the scintillator panel 4 and imaging device 6 are fixed with the resin 24, the connection between scintillator panel 4 and imaging device 6 can be made firm.

Also, though the SiO$_2$ film is used as the transparent inorganic film 16, it is not restrictive; and inorganic films made from Al$_2$O$_3$, TiO$_2$, In$_2$O$_3$, SnO$_2$, MgO, MgF$_2$, LiF, CaF$_2$, SiNO, AgCl, SiN and the like may also be used.

Though CsI(Tl) is used as the scintillator 12 in the above-mentioned embodiment, it is not restrictive; and CsI(Na), NaI(Tl), LiI(Eu), KI(Tl), and the like may also be used.

Though a substrate made of Al is used as the substrate 10 in the above-mentioned embodiment, any substrate can be used as long as it has a favorable X-ray transmissivity, whereby substrates such as those made of amorphous carbon mainly composed of carbon, those made of C (graphite), those made of Be, those made of SiC, and the like may also be used.

Though the scintillator 12 is covered with the first polyparaxylylene film 14, $SiO_2$ film 16, and second polyparaxylylene film 18 in the above-mentioned embodiment, it may be covered with the first polyparaxylylene film 14 alone or with the first polyparaxylylene film 14 and $SiO_2$ film 16. Since the first polyparaxylylene film 14 in contact with the scintillator 12 has an elasticity, the scintillator 12 can also be prevented from being damaged in this case as in the radiation image sensor 2 in accordance with the above-mentioned embodiment.

Though the imaging device 6 is used in the above-mentioned embodiment, a cooling type imaging device (C-CCD) may also be used. In this case, since the stress acting on the scintillator increases upon drastic temperature changes, the scintillator damage prevention effect of the elastic organic film becomes greater.

As the polyparaxylylene film in the above-mentioned embodiment, not only polyparaxylylene but also polymonochloroparaxylylene, polydichloro-paraxylylene, polytetrachloroparaxylylene, polyfluoroparaxylylene, polydimethylparaxylylene, polydiethylparaxylylene, and the like can be used.

According to the radiation image sensor of the present invention, since the scintillator is covered with an elastic organic film, the impact acting on the scintillator can be alleviated by way of the elastic organic film when superposing the scintillator panel onto the imaging device, whereby the scintillator can be prevented from being damaged. Also, even when a distortion is generated in the substrate due to temperature changes, since the scintillator is covered with the elastic organic film, the stress acting on the scintillator according to the distortion of substrate can be alleviated by the elastic organic film, whereby the scintillator can be prevented from being damaged.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radiation image sensor comprising a scintillator panel and an imaging device;
    wherein said scintillator panel comprises:
        a radiation-transparent substrate;
        a scintillator formed on said substrate, said scintillator having top and side faces; and
        an elastic organic film formed continuously from the top face of said scintillator to a surface of said substrate surrounding said scintillator for covering and contacting the top and side faces of said scintillator, wherein said imaging device is disposed on the elastic organic film over said scintillator of said scintillator panel and is firmly attached to said elastic organic film with a resin which surrounds the sides of said scintillator panel.

2. A radiation image sensor according to claim 1, wherein said resin is attached to the side wall portions of said imaging device.

3. A radiation image sensor according to claim 1, further comprises an optical coupling material interposed between said scintillator panel and the imaging surface of said imaging device.

4. A radiation image sensor according to claim 1, wherein said scintillator has a columnar structure.

5. A radiation image sensor according to claim 1, wherein said elastic organic film covers the opposite side of said substrate on which said scintillator formed.

6. A radiation image sensor according to claim 1, wherein said elastic organic film is a multi-layer organic film comprising a first layer and a second layer.

7. A radiation image sensor according to claim 6, wherein said first layer contacts said scintillator and said substrate, and said second layer is in contact with said resin.

* * * * *